Nov. 8, 1955   J. WEST, JR., ET AL   2,723,301
PRIMARY CELL WITH GELATINOUS ELECTROLYTE SHEET
Original Filed Oct. 10, 1946
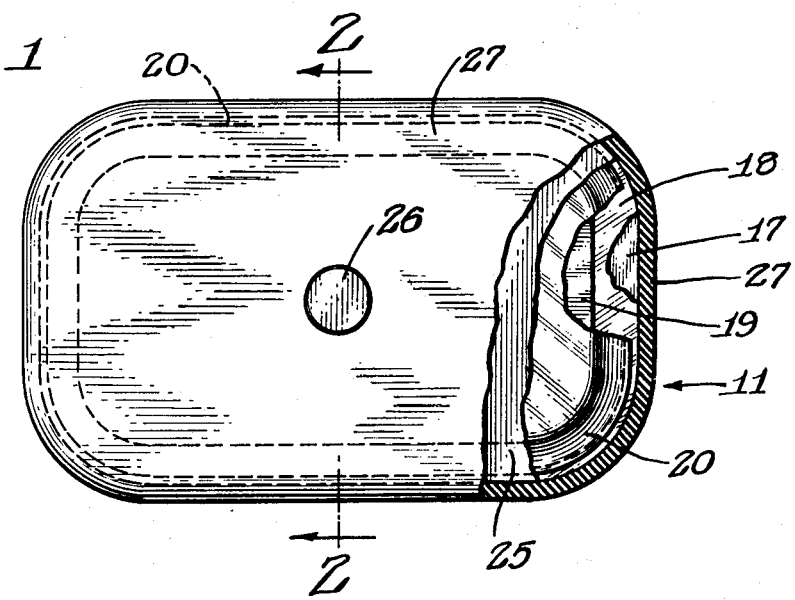
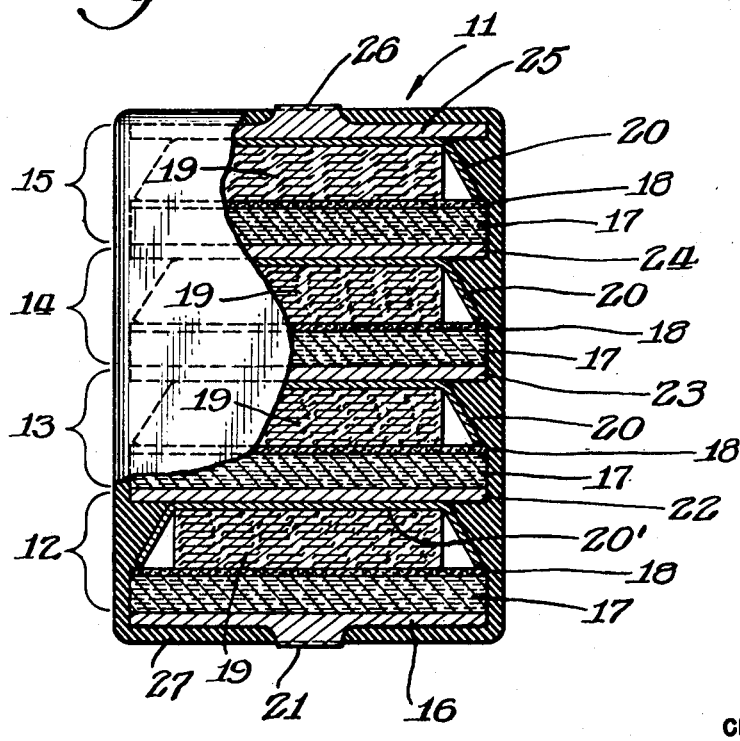
Inventor
JUDSON WEST JR.
CHARLES E. VAN HOY
By Arthur A. Smith
Attorney

United States Patent Office 2,723,301
Patented Nov. 8, 1955

2,723,301

PRIMARY CELL WITH GELATINOUS ELECTROLYTE SHEET

Judson West, Jr. and Charles E. Van Hoy, Fort Wayne, Ind., assignors to The Magnavox Company, Fort Wayne, Ind., a corporation of Delaware Original application October 10, 1946, Serial No. 702,510. Divided and this application February 13, 1951, Serial No. 210,660

3 Claims. (Cl. 136—107)

This specification is a division of our copending application Serial No. 702,510, filed October 10, 1946, now abandoned.

The invention relates to improvements in dry cells, but is specifically directed to a novel electrolytic anode for use in said cells.

A primary object of the invention is to provide a dry cell battery which maintains uniform efficiency substantially throughout its life.

Another object is to provide a cell having uniform internal resistance substantially throughout its life.

A further object of the invention is to provide a cell in which the effective electrolyte thickness between the anode and the cathode is materially reduced, thus effecting a major reduction in internal resistance.

A further object of the invention is to provide a cell in which the effective spacing between the anode and the cathode is not materially increased during the life of the cell, in this manner minimizing changes in internal resistance.

A further object is to provide a novel electrolyte having high conductivity and chemical activity.

Another object is to provide an electrolyte and a cell structure which have such action that corrosion and other hazards caused by conventional free electrolytes and cell structures do not occur.

It is a further object to provide in such cells an improved method of depolarization which substantially prevents increase of internal resistance of the cell by preventing undesired accumulation of gases.

A further object is to provide a cell having a relatively high current-producing capacity in proportion to its size and weight.

Further objects and advantages willl be apparent from the description and the appended claims.

The features of the invention will be more clearly understood by reference to the accompanying drawings and the following description thereof:

Fig. 1 is a perspective view, partly in section, showing the casing of a dry cell broken away;

Fig. 2 is a sectional view taken along line 2—2 of Fig. 1.

The novel battery 11, illustrated in the drawings, comprises at least one cell and preferably a multiplicity of cells such as cells 12, 13, 14 and 15. Each cell, for example cell 12, consists of a terminal member or current collector 16, a combined cathode and depolarizer 17, a dialysis or ion-permeable membrane 18, a combined electrolyte-anode form sustaining wafer 19, and a barrier or current-collecting member 20 of a material, such as zinc, that does not electrochemically react with the anode material. The end terminal member 16 has an integral central boss 21 and differs in that respect from the corresponding current collector members 22, 23 and 24. The other end terminal 25 is identical to terminal member 16 and has an integral boss 26. Each current collector member presents a flat, generally rectangular face to the adjacent member or members, the corners preferably being rounded as clearly shown in Fig. 2. The multi-cell assembly is encased in a housing or casing 27. This provides a simple construction in which each cell touches the adjacent one to provide electrical connection in series.

Member 16 is constructed of a material, preferably a metal such as iron, which is a good conductor and which does not electrochemically react with the cathode material. The boss 21 has a bottom surface projecting through an opening in casing 27 and may, if desired, lie flush with the casing exterior surface. Boss 26 may be similarly arranged. These bosses constitute the external battery terminals. The thickness of the terminal members 16, 22, 23, 24 and 25 is not critical but should be sufficient to provide the required structural strength. As illustrative, for a cell furnishing about 1.5 volts, the thickness of each of those terminal members may conveniently be on the order of 0.01 inch.

In order to accomplish the several objects of this invention, among which are the provision for uniform efficiency and uniform internal resistance substantially throughout the life of the device, together with a relatively high current-producing capacity in proportion to the size and weight of the cells, there is provided a novel arrangement and coordination of cathode, anode and electrolyte. In the conventional construction of dry cells, the anode and cathode of each cell are spaced apart by at least the thickness of the intervening electrolyte. In contradistinction thereto, pursuant to the present invention discrete particles of the anode material, for example, zinc, are uniformly distributed throughout the electrolyte, the result being that the effective electrolyte thickness is reduced to such an extent that the average distance of each anode particle from the cathode is of the order of one-half of the electrolyte thickness. This construction results in increasing the conductivity of the electrolyte and in decreasing the internal resistance of the cell, since internal resistance is an inverse function of conductivity.

Another important factor in maintaining minimum internal resistance is the novel construction of the cathode and the method of maintaining substantially constant spaced relationship between the cathode and anode particles.

In the present invention unitary cathode-depolarizer 17 is of wafer-like construction, its thickness being relatively small in proportion to the area presented to the electrolyte. In its particularly preferred form it is composed of selected percentages of mercuric oxide and graphite. As the chemical action of the electrolyte progressively reduces the mercuric oxide, the effective spacing between the discrete particles of the anode material and the cathode is not materially increased because of the low ratio of cathode thickness to cathode surface area.

For optimum results, the cathode should be composed of an easily reducible metallic oxide the metal of which is electronegative with respect to the anode material, which metallic oxide is only slightly soluble in the electrolyte. While, therefore, within the scope of the broader aspects of this phase of the present invention, various metallic oxides may be employed as, for example, oxides of copper, silver, nickel, cobalt, manganese, and iron, it has been found that mercuric oxide is exceptionally satisfactory and effective and its use in the present environment represents an important, but specific embodiment of the invention. The oxides of the other aforementioned illustrative metals are, in general, more readily soluble than mercuric oxide in the electrolyte and produce a lower electromotive force on open circuits than the cells which utilize mercuric oxide.

As previously indicated, graphite or other non-metallic conductors such as other forms of carbon, or a mixture of graphite and other carbon forms, is mixed in selected proportions with the mercuric oxide or other metallic oxide to form a homogeneous mixture and pressed to form a wafer. In the preferred embodiment the cathode is composed of about 90 to about 93 per cent mercuric oxide and about 10 to about 7 per cent graphite by weight. Lesser proportions of graphite tend to reduce the electrical conductivity and render the cathode fragile, while greater amounts of graphite tend to reduce cell life for any given mass of cathode. The homogeneous mixture of the metallic oxide and the non-metallic conductor is placed in a form and subjected to sufficient pressure preferably without the application of external heat, to form a self-supporting form-sustaining but porous structure. A pressure of the order of 20,000 to 30,000 lbs. per square inch, for example, about 25,000 lbs. per square inch has been found to give satisfactory results in most cases. The thickness of the finished wafers 17 is subject to variation but, in general, it is preferred that the thickness be on the order of 0.034 inch for a cell capable of producing a 5 milliampere current for sixty hours. Although it has been found that best results are obtained by using the above-mentioned ranges for mercuric oxide and graphite, satisfactory results can be obtained by employing a percentage of mercuric oxide as low as 50 per cent by weight and a percentage of graphite as high as 50 per cent by weight. The mercuric oxide should predominate in the unitary cathode-depolarizer structure.

The unitary cathode-depolarizer mixture of mercuric oxide and graphite functions not only as a cathode but also as a rapid depolarizer. The rapidity of depolarization or removal of accumulated gases is an important factor in maintaining low internal resistance of a cell and uniform efficiency substantially throughout its life. In the conventional type of cells in which depolarization is not accelerated, any excessive current drain will cause a considerable drop in voltage, whereas cells constructed in accordance with the present invention on continuous discharge at a normal rate, show no appreciable drop in voltage until the full life of the battery has been reached.

In the operation of a cell embodying the present invention in its preferred form, as the mercuric oxide in the cathode is chemically reduced to metallic mercury, oxygen ions migrate from the mercuric oxide to the anode, which, when, for example, zinc is used in the anode, results in the formation of zinc oxide. Since, as previously explained, discrete particles of anode material, for example, zinc, are dispersed throughout the electrolyte, such anode particles would normally come into contact with the mercury resulting from the reduction of the cathode. To obviate this, an ion-permeable membrane or dialysis membrane 18 is interposed between the unitary cathode-depolarizer wafer and the unitary electrolyte-anode wafer, hereinafter described, to prevent the movement of the mercury toward the anode. This membrane or conductive separator allows migration of ions.

The membrane 18 is preferably made of thin high grade parchment paper or other equivalent sheet material of a quality suitable for dialysis. While the thickness is somewhat variable, a satisfactory thickness has been found to be of the order of 0.006 inch. In the construction of a battery in accordance with the present invention, the membranes are preferably impregnated with the electrolyte before assembly in the cells in order to render them initially conductive and to prevent loss of some of the electrolyte in wafer 19 to the mebrane by absorption.

Unitary electrolyte-anode mixture 19 is in the form of a thin sheet or wafer of semi-solid material having high electrical conductivity and chemical activity. The electrolyte most advantageously comprises a strong alkaline or caustic solution containing a small amount of an oxide of the anode metal used, preferably zinc oxide, an anode material in the form of discrete particles, particularly metallic zinc and a gelling agent to render the mass solid or semi-solid. The zinc oxide assists in preventing the excessive formation of gases which must escape through the porous casing of the battery. To convert the electrolyte to a solid or semi-solid state, the caustic solution containing the added zinc oxide is preferably intimately mixed with a gelling agent and the mixture is then violently agitated while the discrete particles of anode material, particularly amalgamated zinc, are added. These discrete particles of zinc, as stated, serve as the anode of the cells of this invention. The anode must be of a readily oxidizable metal electro positive with respect to the cathode material used and which will not form insoluble blocking barriers. The gelatinous mixture, in the form of sheets, is then cured, cooled and cut to the desired size of wafers. A thickness of about 0.050 to about 0.075 inch is quite satisfactory in most cases, and a thickness of 0.055 inch has been found to give particularly satisfactory results. It is particularly preferred to employ caustic soda or caustic potash as the electrolyte and, while various gelling agents may be used, carboxy methyl cellulose and salts of carboxy methyl cellulose have been found to be especially satisfactory. Specifically, a sodium salt of carboxy methyl cellulose has been used with excellent results, and a mixture of carboxy methyl cellulose and one or more of its salts or a mixture of its salts is satisfactory. The zinc powder is advantageously amalgamated or coated with a thin layer of mercury prior to its addition to the electrolyte gelling agent mixture. The mercury, in this case, serves to inhibit undesired local action.

While the proportions of ingredients present in the unitary electrolyte-anode wafers 19 are subject to variation, in general, it is preferred that they fall into the following ranges, by weight: 17 to 20 parts of alkali metal hydroxide, 50 to 70 parts of zinc or other anode material, 6 to 10 parts of gelling agent, 20 to 30 parts of water, and, where used, 2 to 4 parts of zinc oxide.

The following example is illustrative of the preparation of a unitary electrolyte-anode wafer suitable for use in accordance with the present invention. It will be understood that various changes may be made with respect to the ingredients employed, the proportions thereof, and times and temperature of treatment without departing from the essential teachings and guiding principles of the present invention.

75 grams of potassium hydroxide and 10 grams of zinc oxide were dissolved in 100 milliliters of water, and the resulting electrolyte was then gelled by adding 1 part of carboxy methyl cellulose to 9 parts of the electrolyte by weight. The mixture was then agitated at 0–10 degrees centigrade for about five minutes until the gelling agent was completely dispersed throughout the electrolyte. It is advantageous to operate at low temperatures, preferably of the order indicated, so as to obtain a smooth homogeneous mixture having the appearance of cooked starch. The gelled electrolyte was then vigorously stirred while adding 1 part of amalgamated zinc powder to 1 part of gelled electrolyte. Stirring was continued until the zinc powder was uniformly dispersed. The mixture was then cast into sheets of a thickness of about 0.05 inch, cured for about 1 hour at about 120 degrees centigrade, cooled for about ½ hour at room temperature, and then cut into the required dimensions to form the wafers for the cells. It will thus be seen that each wafer is a self-supporting structure, easily installed, and completely eliminates the need for individual cell casings in multi-cell batteries.

In prior construction of multi-cell batteries it has been the practice to maintain such batteries in assembly by tapes and the like. Such construction provides creeping paths or bridges for the conventional electrolyte and permits it to pass between cells. This action results in the formation of high resistance junctions between cells, caused by corrosion. In the present invention this "bridging" action of the electrolyte between cells is substantially retarded by the aforementioned novel construction of the electrolyte. To further prevent any possibility of creeping action, barrier members 20 are provided which, in their preferred form, are made of passivated zinc or have one passivated surface. Although it is not essential that these barriers be of the same material as the anode, they must be of a material that is electrically conductive and which is electrochemically non-reactive with respect to the anode and which will not introduce cell action of the wrong polarity.

Broadly, in the embodiment of the invention barriers 20 comprising thin sheets of zinc are positioned between the electrolyte-anode wafer 19 and the adjacent cell 13. Before being positioned the surfaces of the barriers which are to be positioned adjacent the anode-electrolyte wafers are subjected to a passivation treatment which makes the zinc surfaces chemically inert to the electrolyte. The functions of the passivated barrier are to prevent the creeping of the electrolyte from the electrolyte-anode wafer on one side of the barrier to the adjacent cell on the other side of the barrier and to prevent undesired electrochemical action between said electrolyte-anode wafer and the iron current-collecting member in said adjacent cell. One suitable passivation method consists in first treating the zinc with a strong caustic solution, rinsing in distilled water and then treating the sheets in a concentrated solution of chromic oxide for about 30 seconds. The sheets are then rinsed and dried and are ready for use. This treatment provides a film of a chromated zinc compound of about 70 microns thickness which is not readily corroded by the electrolyte while the shape of the barrier members prevents any appreciable movement of thin films of the electrolyte across and over the face of these barrier members. Specifically, as illustrated in the accompanying drawings (Fig. 2), the passivated barrier takes the form of an inverted cup shape or is integrally provided with a depending annular flange 20. This specific embodiment is more fully described and specifically claimed in an application Serial No. 702,809, filed October 11, 1946, by LaVern E. Quinnell, assigned to the same assignee as the present application and invention, entitled "Dry Cell Battery."

Casing 27 serves not only completely to seal the battery structure and prevent the cells from breaking their series electrical contacts, but it is gas permeable. To achieve these results, the casing 27 is made of micro-crystalline wax. A thickness of the order of about 1/16 inch being quite satisfactory in most cases. In prior cell constructions, where the cell was hermetically sealed with ordinary waxes, resins, tars, and the like, although a rigid connection was maintained between cells the gas produced by chemical action within the cells could not escape and the resultant pressure damaged the battery and broke the electrical contact between cells. By utilizing micro-crystalline wax, for the casing, this objection is obviated.

In the present invention in the final assembly of a multi-cell battery the individual elements and cells are placed in a stacking fixture and pressure applied to hold the parts in position while being quickly dipped in the molten micro-crystalline wax to form the casing.

It will be understood that the amount of current which can be drawn from the cell is dependent upon several factors, one of which is the surface cathode area presented to the anode, while the length of time during which the cell can supply current is dependent, among other things, on the mass of cathode. Sufficient anode material is provided to assure cell action until the cathode is completely reduced. In an illustrative cell made in accordance with the present invention wherein a total of 1.5 grams of mercuric oxide was used in the cathode wafer, a continuous current of 5 milliamperes was provided over a period of sixty hours. This illustrative cell had the following parameters:

| Element | Surface Dimensions, inches | Thickness, inches |
|---|---|---|
| 16 | 0.835 x 0.465 | 0.010 |
| 17 | 0.835 x 0.465 | 0.034 |
| 18 | 0.835 x 0.465 | 0.006 |
| 19 | 0.735 x 0.385 | 0.055 |
| 20 | 0.835 x 0.465 x 0.040 | 0.005 |
| 25 | 0.835 x 0.465 | 0.010 |

| Constituent | Percentage by Weight |
|---|---|
| Mercuric Oxide | 90% of wafer 17. |
| Graphite | 10% of wafer 17. |
| Potassium Hydroxide | 17.15% of wafer 19. |
| Zinc Oxide | 2.3% of wafer 19. |
| Carboxy Methyl Cellulose | 7.6% of wafer 19. |
| Amalgamaged Zinc | 50% of wafer 19. |
| Water | 22.95% of wafer 19. |

While there has been shown and described what is at present considered to be the preferred embodiment of the present invention, it will be obvious to those skilled in the art that various modifications and substitutions of equivalents may be made without departing from the teachings of the invention.

Having thus described our invention, we claim:

1. An electrolyte sheet for a primary cell, comprising a substantially solid, dimensionally stable gel consisting of water and a member of the group consisting of carboxymethylcellulose, salts of carboxymethylcellulose, and mixtures of carboxymethylcellulose and salts of carboxymethylcellulose, and containing a caustic alkali.

2. An electrolyte sheet for a primary cell according to claim 1, in which the alkali is sodium hydroxide.

3. An electrolyte sheet for a primary cell according to claim 1, in which the alkali is potassium hydroxide.

References Cited in the file of this patent

UNITED STATES PATENTS 2,593,893     King     Apr. 22, 1952

OTHER REFERENCES

Industrial and Engineering Chemistry, October 1945, pp. 943–944, vol. 37, No. 10.